US010102304B1

(12) United States Patent
Muralidharan et al.

(10) Patent No.: US 10,102,304 B1
(45) Date of Patent: Oct. 16, 2018

(54) MULTI-STAGE DIGITAL CONTENT EVALUATION

(71) Applicant: GOOGLE LLC, Mountain View, CA (US)

(72) Inventors: Omkar Muralidharan, Sunnyvale, CA (US); Liadan OCallaghan, Menlo Park, CA (US); Christopher Davis Monkman, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 224 days.

(21) Appl. No.: 14/968,671

(22) Filed: Dec. 14, 2015

(51) Int. Cl.
*G06F 17/21* (2006.01)
*G06F 17/30* (2006.01)
*H04L 29/08* (2006.01)
*G06F 17/22* (2006.01)

(52) U.S. Cl.
CPC .. *G06F 17/30893* (2013.01); *G06F 17/30905* (2013.01); *H04L 67/02* (2013.01); *H04L 67/20* (2013.01)

(58) Field of Classification Search
CPC ................................................. G06F 17/30401
See application file for complete search history.

(56) References Cited

U.S. PATENT DOCUMENTS

| 2002/0128959 | A1* | 9/2002 | Kostic | G06Q 40/04 705/37 |
| 2011/0161308 | A1* | 6/2011 | Andersen | G06F 17/30867 707/707 |
| 2013/0246169 | A1* | 9/2013 | Berry | G06Q 30/0276 705/14.49 |

* cited by examiner

*Primary Examiner* — James J Debrow
(74) *Attorney, Agent, or Firm* — Fish & Richardson P.C.

(57) ABSTRACT

Methods, systems, and apparatus, including computer programs encoded on a computer storage medium, for evaluating digital content. In one aspect, a system includes a distributed computing system that access the third-party corpus database to evaluate the various third-party content, based at least in part on the one or more parameters, and transmit digital data corresponding to a set of the various third-party content to a user device. The evaluation can include a first evaluation process that provides a cost-prominence relationship for various third party content and is used, in part, to select a format for at least some of the third-party content, and a second evaluation process that is used to select locations of an electronic document for at least some of the third-party content. The multiple evaluation processes can be completed in less time than a combinatorial evaluation process.

23 Claims, 3 Drawing Sheets

MULTI-STAGE DIGITAL CONTENT EVALUATION

BACKGROUND

This specification relates to data processing and multi-stage digital content evaluation.

The Internet facilitates the exchange of information and transactions between users across the globe. This exchange of information enables distribution of content to a variety of users. In some situations, content from multiple different providers can be integrated into a single electronic document to create a composite document. For example, a portion of the content included in the electronic document may be selected (or specified) by a publisher of the electronic document. A different portion of content (e.g., digital third-party content) can be provided by a third-party (e.g., an entity that is not a publisher of the electronic document). In some situations, the third-party content is selected for integration with the electronic document after a user has already requested presentation of the electronic document. For example, machine executable instructions included in the electronic document can be executed by a user device when the electronic document is presented at the user device, and the instructions can enable the user device to contact one or more remote servers to obtain third-party content that will be integrated into the electronic document.

SUMMARY

In general, one innovative aspect of the subject matter described in this specification can be embodied in systems that include a third-party corpus database electronically storing various third-party content that are available to be incorporated into an electronic document, wherein the various third-party content are indexed in the third-party corpus database according to one or more parameters; a distributed computing system including a set of multiple computing devices that are interconnected and electronically access the third-party corpus database to evaluate the various third-party content, based at least in part on the one or more parameters, and transmit digital data corresponding to a set of the various third-party content to a user device. The digital data can include machine readable instructions that configure the user device to incorporate the set of various third-party content into a presentation of a given electronic document at the user device. The distributed computing system selects the set of various third-party content and formatting for the at least some of the various third-party content in the set based on multiple evaluation processes including a first evaluation process that provides the distributed computing system with a cost-prominence relationship for each third-party content in the set and a second evaluation process that identifies a winning third-party content for each of one or more locations of the electronic document, including at least a first location. The digital data include instructions that present at least some of the various third-party content at the user device according to a given format that is automatically selected by the distributed computing system based on output of the first evaluation process. Other embodiments of this aspect include corresponding methods, apparatus, and computer programs.

These and other embodiments can each optionally include one or more of the following features. One of the computing devices in the distributed computing system can be a server that is configured to segment the evaluation of the various third party content into multiple separate tasks that are respectively assigned to two or more other computing devices in the distributed computing system. The two or more other computing devices are each configured to separately process the separate tasks that are respectively assigned to the two or more other computing devices, and electronically communicate results of the separate tasks to the server.

The first evaluation process and the second evaluation process are performed by the distributed computing system in less time than that required for the distributed computing system to perform a combinatorial evaluation process using the set of third-party content.

The first evaluation process can include, for each given third-party content, a series of operations including determining, for each location of the given electronic document, a bid required for the given third-party content to be presented at the location, obtaining, for each location of the given electronic document, an estimated prominence value for the given third-party content; and creating, in a memory structure, the cost-prominence relationship for the given third-party content.

The distributed computing system can create the cost-prominence relationship based on an interpolation of cost-prominence pairs that each specify the estimated prominence values for the given third-party content at a given location of the electronic document and the bid required for the given third-party content to be presented at the given location of the electronic document.

The distributed computing system can determine, for each format of each given third-party content, a normalizer for each location of the given electronic document based on a cost of a click when formatted according to the format and presented in the location relative to a cost of a click when presented in the location but not formatted according to the format.

The second evaluation process can include a selection by the distributed computing system of a highest ranking third-party content as the winning third-party content, wherein the distributed computing system performs the ranking based on a rank score that is determined, by the distributed computing system, based, at least in part, on an estimated prominence value attributed the first location, an estimated prominence value for the given third-party content when formatted according to the format, and the normalizer for the format of the given third-party content at the first location.

The distributed computing system can automatically determine a price to be paid for distribution of the winning third-party content based on a function of a cost of user interaction when the winning third-party content is presented in the first location and according to the selected format and a cost of a user interaction when the winning third-party content is presented in the first location but not formatted according to the selected format.

Another innovative aspect of the subject matter described in this specification can be embodied in methods that include the operations of identifying a presentation opportunity for presentation of third-party content in various locations of a given electronic document presented at a user device; evaluating, based on information related to the identified presentation opportunity, a corpus of electronically stored third-party content to identify a set of third-party content eligible to be presented in the given electronic document; performing, by a distributed computing system, a first evaluation process using the set of third-party content to obtain a cost-prominence relationship for each third-party content in the set; performing, for a first location of the given electronic document and by the distributed computing system, a second evaluation process to identify a winning third-party content for the first location; and selecting, by the distributed computing system, a format for at least some of the winning third-party content based, at least in part, on output of the first evaluation process; transmitting, to the user device, machine readable instructions that automatically configure the user device to present the winning third-party content with the given electronic document and according to the format, wherein the first evaluation process and the second evaluation process are performed after identifying the presentation opportunity, and within a latency constraint. Other embodiments of this aspect include corresponding systems, apparatus, and computer programs, configured to perform the actions of the methods, encoded on computer storage devices.

These and other embodiments can each optionally include one or more of the following features. The first evaluation process and the second evaluation process can be performed by a distributed computing system in less time than that required for the distributed computing system to perform a combinatorial evaluation process using the set of third-party content.

Performing the first evaluation process can include, for each given third-party content: determining, for each location of the given electronic document, a bid required for the given third-party content to be presented at the location; obtaining, for each location of the given electronic document, an estimated prominence value for the given third-party content; and creating, in a memory structure, the cost-prominence relationship for the given third-party content.

Creating the cost-prominence relationship for the given third-party content can include creating, in the memory structure, the cost-prominence relationship based on an interpolation of cost-prominence pairs that each specify the estimated prominence values for the given third-party content at a given location of the electronic document and the bid required for the given third-party content to be presented at the given location of the electronic document.

Methods can include the operations of, for each given third-party content: determining, for each format of the given third-party content, a normalizer for each location of the given electronic document based on a cost of a click when formatted according to the format and presented in the location relative to a cost of a click when presented in the location but not formatted according to the format.

Performing the second evaluation process can include, for the first location of the given electronic document: determining, for each format of each given third-party content, a rank score based, at least in part, on an estimated prominence value attributed the first location, an estimated prominence value for the given third-party content when formatted according to the format, and the normalizer for the format of the given third-party content at the first location; ranking each given third-party content based on the rank score for the given third-party content; and selecting a highest ranking third-party content as the winning third-party content.

Methods can include the actions of determining a price to be paid for distribution of the winning third-party content including identifying the price to be paid based on a function of a cost of user interaction when the winning third-party content is presented in the first location and according to the selected format and a cost of a user interaction when the winning third-party content is presented in the first location but not formatted according to the selected format.

Particular embodiments of the subject matter described in this specification can be implemented so as to realize one or more of the following advantages. The subject matter discussed in this application enables third-party digital content ("third-party content") to be distributed over the Internet within a specified amount of time (e.g., within a time constraint) following a request for the content. For example, the subject matter of this application enables a portion of third-party content to be distributed for inclusion in a web page (or native application) after the web page (or a given portion of the native application) has been requested, rendered and/or presented by a user device. The third-party content can be distributed and/or presented without delaying presentation of the web page (or given portion of the native application) and within a specified amount of time following the user's request for a web page (or given portion of the native application). Providing the third-party content for presentation within the specified amount of time prevents page loading errors (or other errors) that may occur if the third-party content is provided after the specified amount of time, and reduces the likelihood that the third-party content fails to be presented (e.g., due to timeout conditions or the user navigating away from the web page). In some implementations, the third-party content is selected within one second of the request.

The subject matter described in this document also reduces the amount of time required for a data processing apparatus to select content for distribution relative to the amount of time required to select content using a combinatorial selection processes. For example, the double evaluation process discussed in this document enables the data processing apparatus to output a selection of third-party content orders of magnitude faster than would be required by the data processing apparatus to output the selection using a combinatorial selection process. This results in less latency in outputting third-party content in response to the request for third-party content, which prevents errors (e.g., page load errors, unfilled portions of a web page, or other errors that negatively impact a user's experience) that can be caused by additional latency. The subject matter described in this document can also provide better auction decisions than a purely greedy auction, for example, because the present subject matter can differentiate between format-based prominence (i.e., prominence resulting from formatting applied to third-party content) and position prominence (i.e., prominence resulting from where third-party content is presented). Further, the present subject matter can charge for prominence irrespective of the source, for example, by charging a same price for a given amount of prominence no matter how it is obtained.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

This document discloses methods, systems, apparatus, and computer readable medium that facilitate distribution of third-party content for integration into an electronic document. The electronic document can be provided by a publisher, and the third-party content can be provided by an entity (e.g., a third-party) that differs from the publisher. As discussed in more detail below, the selection of the third-party content can be performed by a set of computing devices (e.g., specially programmed and/or configured devices) using a multiple-stage evaluation process. For example, one evaluation process can be performed to generate, in a data structure, cost-prominence relationships for a set of third-party content that is eligible to be presented in a given electronic document, while another evaluation process can be performed to determine which third-party content is actually selected for presentation, locations of the electronic document in which each selected third-party content will be presented, formatting that will be applied to each selected third-party content, and/or a price that will be paid for presentation of each selected third-party content.

The cost-prominence relationship for each third-party content represents various amounts that should be paid for the third-party content to obtain various levels of prominence. As used throughout this document, a level of prominence, which can be expressed as a prominence value, is a measure of exposure. For example, the level of prominence for a given third-party content can be a click-through rate for the third-party content. As discussed in further detail below, the level of prominence for a given third-party content can vary based, at least in part, on a location of the electronic document at which the third-party content is presented and/or formatting options that are applied to the given third-party content.

The multiple-stage evaluation process can be carried out in a distributed computing environment, and using information from millions of available portions of third-party content. The multiple-stage evaluation process can be performed, for example, after a user device requests presentation of the electronic document and in near real-time, so that the selected third-party content is presented at the user device with the electronic document. The multiple-stage evaluation process enables computing devices to output results similar to those that would be provided by a combinatorial selection process, but requires significantly less time than performing the combinatorial selection process.

Figure 1:
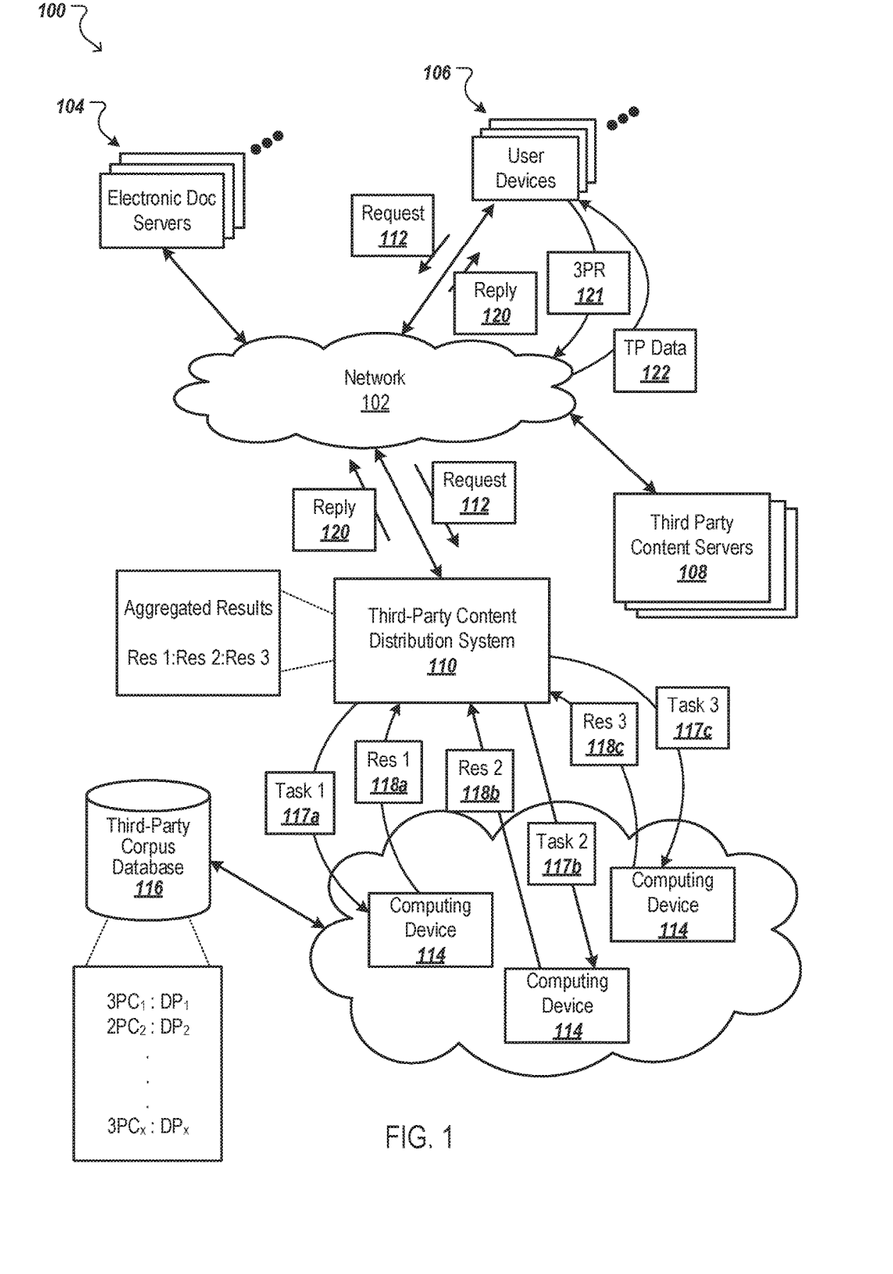
FIG. 1 is a block diagram of an example environment in which content is distributed.

FIG. 1 is a block diagram of an example environment 100 in which third-party content is distributed for presentation with electronic documents. The example environment 100 includes a network 102, such as a local area network (LAN), a wide area network (WAN), the Internet, or a combination thereof. The network 102 connects electronic document servers 104, user devices 106, third-party content servers 108, and a third-party content distribution system 110 (also referred to as a content distribution system). The example environment 100 may include many different electronic document servers 104, user devices 106, and third-party content servers 108.

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102, but native applications executed by the user device 106 can also facilitate the sending and receiving of data over the network 102.

An electronic document is data that presents a set of content at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to user devices 106 by electronic document servers 104. For example, the electronic document servers 104 can include servers that host publisher websites. In this example, the user device 106 can initiate a request for a given publisher webpage, and to the electronic server 104 that hosts the given publisher webpage can respond to the request by sending machine executable instructions that initiate presentation of the given webpage at the user device 106.

In another example, the electronic document servers 104 can include app servers from which user devices 106 can download apps. In this example, the user device 106 can download files required to install an app at the user device 106, and then execute the downloaded app locally.

Electronic documents can include a variety of content. For example, electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into the given electronic document to create a composite electronic document including the content obtained from the data source.

In some situations, a given electronic document can include a third-party tag or third-party script that references the third-party content distribution system 110. In these situations, the third-party tag or third-party script is executed by the user device 106 when the given electronic document is processed by the user device 106. Execution of the third-party tag or third-party script configures the user device 106 to generate a request for third-party content 112, which is transmitted over the network 102 to the third-party content distribution system 110. For example, the third-party tag or third-party script can enable the user device 106 to generate packetized data request including a header and payload data. The request 112 can include data such as a name (or network location) of a server from which the third-party content is being requested, a name (or network location) of the requesting device (e.g., the user device 106), and/or information that the third-party content distribution system 110 can use to select third-party content provided in response to the request. The request 112 is transmitted, by the user device 106, over the network 102 (e.g., a telecommunications network) to a server of the third-party content distribution system 110.

The request 112 can include data specifying the electronic document and characteristics of locations at which third-party content can be presented. For example, data specifying a reference (e.g., URL) to an electronic document (e.g., webpage) in which the third-party content will be presented, available locations of the electronic documents that are available to present third-party content, sizes of the available locations, and/or media types that are eligible for presentation in the locations can be provided to the content distribution system 110. Similarly, data specifying keywords associated with the electronic document ("document keywords") or entities (e.g., people, places, or things) that are referenced by the electronic document can also be included in the request 112 (e.g., as payload data) and provided to the content distribution system 110 to facilitate identification of content items that are eligible for presentation with the electronic document.

Requests 112 can also include data related to other information, such as information that the user has provided, geographic information indicating a state or region from which the request was submitted, or other information that provides context for the environment in which the third-party content will be displayed (e.g., a type of device at which the third-party content will be displayed, such as a mobile device or tablet device). Requests 112 can be transmitted, for example, over a packetized network, and the requests 112 themselves can be formatted as packetized data having a header and payload data. The header can specify a destination of the packet and the payload data can include any of the information discussed above.

The third-party content distribution system 110 chooses third-party content that will be presented with the given electronic document in response to receiving the request 112 and/or using information included in the request 112. In some implementations, the third-party content is selected in less than a second to avoid errors that could be caused by delayed selection of the third-party content. For example, delays in providing third-party content in response to a request 112 can result in page load errors at the user device 106 or cause portions of the electronic document remain unpopulated even after other portions of the electronic document are presented at the user device 106. Also, as the delay in providing third-party content to the user device 106 increases, it is more likely that the electronic document will no longer be presented at the user device 106 when the third-party content, thereby negatively impacting a user's experience with the electronic document. Further, delays in providing the third-party content can result in a failed delivery of the third-party content, for example, if the electronic document is no longer presented at the user device 106 when the third-party content is provided.

In some implementations, the third-party content distribution system 110 is implemented in a distributed computing system that includes, for example, a server and a set of multiple computing devices 114 that are interconnected and identify and distribute third-party content in response to requests 112. The set of multiple computing devices 114 operate together to identify a set of third-party content that are eligible to be presented in the electronic document from among a corpus of millions of available third-party content ($3PC_{1-x}$). The millions of available third-party content can be indexed, for example, in a third-party corpus database 116. Each third-party content index entry can reference the corresponding third-party content and/or include distribution parameters ($DP_1$-$DP_x$) that condition the distribution of the corresponding third-party content.

In some implementations, the distribution parameters for a particular third-party content can include distribution keywords that must be matched (e.g., by electronic documents or terms specified in the request 112) in order for the third-party content to be eligible for presentation. The distribution parameters can also require that the request 112 include information specifying a particular geographic region (e.g., country or state) and/or information specifying that the request 112 originated at a particular type of user device (e.g., mobile device or tablet device) in order for the third-party content to be eligible for presentation. The distribution parameters can also specify a bid and/or budget for distributing the particular third-party content.

The identification of the eligible third-party content can be segmented into multiple tasks 117a-117c that are then assigned among computing devices within the set of multiple computing devices 114. For example, different computing devices in the set 114 can each analyze a different portion of the third-party corpus database 116 to identify various third-party content having distribution parameters that match information included in the request 112. In some implementations, each given computing device in the set 114 can analyze a different data dimension (or set of dimensions) and pass results (Res 1-Res 3) 118a-118c of the analysis back to the third-party content distribution system 110. For example, the results 118a-118c provided by each of the computing devices in the set may identify a subset of third-party content that are eligible for distribution in response to the request and/or a subset of the third-party content that have certain distribution parameters or attributes.

The third-party content distribution system 110 aggregates the results 118a-118c received from the set of multiple computing devices 114 and uses information associated with the aggregated results to select one or more third-party contents that will be provided in response to the request 112. For example, the third-party content distribution system 110 can select a set of winning third-party content based on the outcome of one or more content evaluation processes, as discussed in further detail below. In turn, the third-party content distribution system 110 can generate and transmit, over the network 102, reply data 120 (e.g., digital data representing a reply) that enable the user device 106 to integrate the set of winning third-party content into the given electronic document, such that the set of winning third-party content and the content of the electronic document are presented together at a display of the user device 106.

In some implementations, the user device 106 executes instructions included in the reply data 120, which configures and enables the user device 106 to obtain the set of winning third-party content from one or more third-party content servers. For example, the instructions in the reply data 120 can include a network location (e.g., a Uniform Resource Locator (URL)) and a script that causes the user device 106 to transmit a third-party request (3PR) 121 to the third-party content server 108 to obtain a given winning third-party content from the third-party content server 108. In response to the request, the third-party content server 108 will transmit, to the user device 106, third-party data (TP Data) 122 that causes the given winning third-party content to be incorporated to the electronic document and presented at the user device 106.

The content distribution system 110 can utilize one or more evaluation processes to identify and select the set of winning third-party content for each given request (e.g., based on data corresponding to the request). In some implementations, the evaluation process is not only required to determine which third-party content to select for presentation with the electronic document, but also the type of formatting that will be dynamically (e.g., on a per-request basis) applied to the selected third-party content, and the price that will be paid for presentation of the selected third-party content when presented with the applied formatting. The dynamic formatting is applied to the selected third-party content can change a visual characteristic of the third-party content on a per-presentation-opportunity basis, such that the third-party content can have a different appearance depending on the presentation opportunity.

The formatting options applied to each third-party content can include, for example, an amount of display space utilized to present the third-party content, text font options (e.g., text size and/or style such as bold, italics, or color), sizes of images included in the third-party content, a number of active links (e.g., links that enable the user device to take an action, such as contacting a remote server) that are included in the third-party content, a number of other items (e.g., maps, factual information, directions, phone numbers, or interactive elements) that are appended to or otherwise included in the third-party content, or animation applied to a portion of the third-party content.

The formatting of each third-party content can affect a level of prominence or the third-party content. For example, the level of prominence for a given third-party content that is presented in a larger portion of the display space, will generally be higher than the level of prominence for the given third-party content if it is presented in a smaller portion of the display space. Similarly, formatting the given third-party content to include interactive elements (e.g., visual buttons that when clicked cause the user device to take an action) or other additional elements such as those listed above, will generally provide the given third-party content a higher level of prominence relative to the level of prominence of the given third-party content absent the formatting. The location within the electronic document at which the given third-party content is presented will also affect its level of prominence. For example, the level of prominence for the given third-party content at one display location (e.g., a banner location of the electronic document) may be higher than the level of prominence for the given third-party content at a different display location (e.g., a display location that is further down the page or below the fold).

In some situations, a third-party will pay a certain amount in order for their third-party content to be presented at a given display location. For example, based on the outcome of a single evaluation process, a given third-party may pay the minimum amount required to obtain the given display location (e.g., an amount that is just higher than the amount another third-party is willing to pay for the given display location). In this example, the amount paid by the given third-party considers the prominence provided by the given display location, but does not necessarily take into account formatting that may be applied to the third-party content is presented in the given display location. As such, using the single evaluation process in this example, may result in the presentation of less desirable third-party content (e.g., because the formatting of the presented third-party content may not provide as much prominence as the formatting applied to a different third-party content) and/or improper pricing of third-party content presentations.

One option for taking formatting options into account during the evaluation of third-party content is to perform a combinatorial selection process (e.g., a combinatorial auction). In the combinatorial selection process, a separate value can be assigned to each combination of available presentation locations, third-party contents, and formatting options. However, as the number of available presentation locations, third-party contents, and formatting options increase so does the computation complexity of obtaining a result using a combinatorial selection process. As such, using a combinatorial selection process may not be feasible depending on the time constraints within which third-party content must be selected and/or available computing resources.

For example, as discussed above, the time constraint for selecting third-party content for presentation with electronic document can be limited to less than one second after identifying a presentation opportunity. In this example, it may not be possible to complete the combinatorial selection process within the time constraint given the large number of available third-party content and formatting options that currently exist. However, results similar to those provided by a combinatorial selection process can be obtained within the time constraint using a multi-stage evaluation process (e.g., two or more separate evaluation processes that operate together to select third-party content for presentation). Some additional advantages provided by using a multistage evaluation process include decoupling the process of selecting locations at which various third-party content will be presented within a given electronic document from the respective auction scores of the various third-party content. In particular, as discussed in more detail below, the various third-party content will each have an opportunity to obtain each presentation position irrespective of their auction score. This results in an allocation process that charges based on prominence provided to third-party content irrespective of the source of that prominence (e.g., due to presentation in a more prominent location of the electronic document or due to formatting that is applied to the third-party content).

Figure 2:
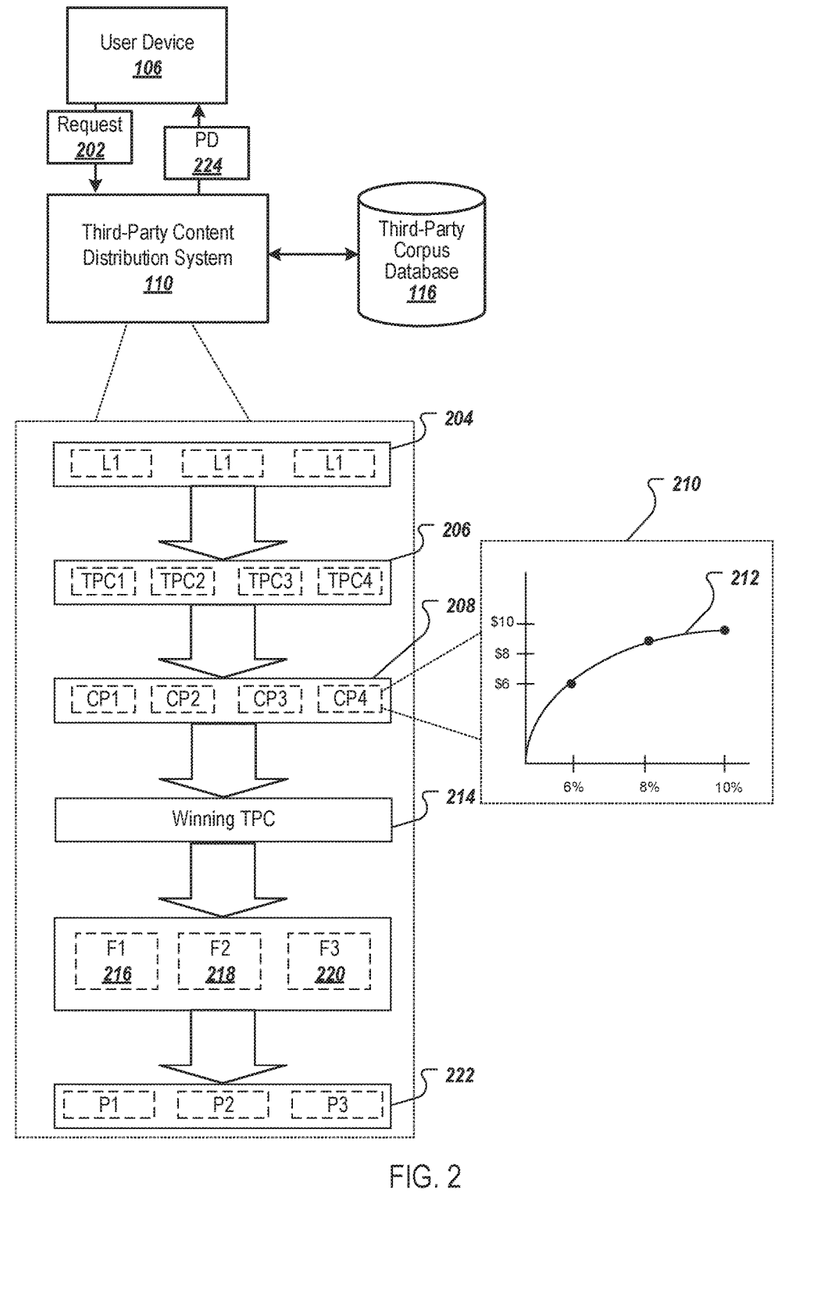
FIG. 2 is a block diagram of an example data flow for using a multi-stage evaluation process to select third-party content for incorporation into an electronic document.

FIG. 2 is a block diagram of an example data flow 200 for using a multi-stage evaluation process to select third-party content for incorporation into an electronic document. The selected third-party content (also referred to as "winning third-party content") can be integrated with the electronic document, as discussed in detail above. In some implementations, the data flow 200 can be implemented using the content distribution system 110. In FIG. 2, the computing devices 114 of the content distribution system 110 are not shown for clarity and to simplify the figure.

The data flow 200 begins with the content distribution system 110 identifying a presentation opportunity 202. In some implementations, the presentation opportunity 202 is identified when the content distribution system 110 receives a request for third-party content. For example, as discussed above, execution of the script by the user device 106 can cause the user device 106 to submit (e.g., transmit over a data network) a request for third-party content to the content distribution system 110. In some implementations, the presentation opportunity 202 is identified based on an analysis of content associated with an electronic document. For example, analysis of a social network user's stream, or other information associated with an account of a social network user, can reveal an opportunity to include third-party content in the social network user's stream. In a particular example, the content distribution system 110 (or another set of data processing apparatus) can crawl content associated with the account of the social network user to identify attributes that match distribution criteria for available third-party content. The identification of these attributes that match distribution criteria for available third-party content can constitute the identification of a presentation opportunity.

The content distribution system 110 can use information associated with the presentation opportunity 202 to identify a set of various locations 204 (e.g., L1, L2, and L3) of an electronic document that are available for presenting third-party content. For example, in the context of a request for third-party content, the request may include information identifying a number of available presentation locations in the electronic document, relative display locations of the available presentation locations, sizes of the display locations, and/or other information related to the available presentation locations. Similar information related to the presentation opportunity 202 can be identified through the analysis of electronic document.

The content distribution system 110 can also use information associated with the presentation opportunity 202 to identify a candidate set of third-party content 206 (e.g., TPC1, TPC2, TPC3, and TPC4) that is eligible to be presented in response to the presentation opportunity 202. For example, the content distribution system 110 can evaluate a corpus of electronically stored third-party content in the third-party corpus database 116, as discussed above, to identify TPC1, TPC2, TPC3, and TPC4 as the candidate set of third-party content 206.

The content distribution system 110 performs a first evaluation process using the candidate set of third-party content 206. The first evaluation process can be, for example, an evaluation process that identifies winning third-party content independent of formatting that may be applied to the third-party contents. For example, the first evaluation process can be a process that identifies the winning third-party content based, at least in part, on bids associated with the third-party content. In a particular example, the winning third-party content for each presentation location may be a third-party content having a highest bid (e.g., relative to bids of other third-party content that have not already been selected as winning third-party content for another presentation location in a given electronic document). In another example, the winning third-party content for each presentation location may be a third-party content having a highest selection score (e.g., relative to selection scores of other third-party content that have not already been selected as winning third-party content for another presentation location in a given electronic document).

The selection score for each third-party content can be, for example, determined based on a function of the bid corresponding to the third-party content and/or one or more other parameters. For example, the bid for each third-party content can be scaled by some attribute value that is specific to that third-party content to arrive at the selection score for that third-party content. The attribute value used to scale the third-party content bids can be a performance (or quality) measure selected, for example, by an administrator of the content distribution system 110 or an administrator of the first evaluation process.

Continuing with the first evaluation process, the content distribution system 110 obtains, for each third-party content (e.g., TPC1, TPC2, TPC3, and TPC4), an estimated prominence value corresponding to presentation of the third-party content in each of the presentation locations (e.g., L1, L2, and L3), which may be a subset of available presentation locations on the electronic document. In some implementations, the estimated prominence value corresponding to presentation of the third-party content in each of the presentation locations can be an aggregate estimated click-through rate associated with each of the positions (e.g., independent of which third-party content is presented in the presentation locations). Continuing with the example above, the aggregate estimated click-through rate associated with L1 may be 10% CTR, while the aggregate estimated click-through rate for L2 and L3 may be 8% and 6%, respectively. In this example, these aggregate estimated click-through rates for the various presentation locations can be used to construct (or create) the cost-prominence relationships for each of the third-party contents (e.g. TPC1, TPC2, TPC3, and TPC4).

In some implementations, the first evaluation process is used, at least in part, to obtain a set of cost-prominence relationships 208 (CP1-CP4) for the candidate set of third-party content 206. In particular, the first evaluation process can generate a separate cost-prominence relationship for each third-party content that is included in the set of third-party content 206. As discussed above, the cost-prominence relationship for each third-party content represents various amounts that should be paid for that third-party content to obtain various levels of prominence. The cost-prominence relationships may vary on a per-presentation-opportunity basis, and therefore may be generated on a per-presentation-opportunity basis taking into account the information associated with each particular presentation opportunity. FIG. 2 includes an example cost-prominence relationship 210 for TPC4.

The cost-prominence relationship 210 shows various levels of prominence (e.g., expressed as prominence values) along the x-axis, and shows various costs along the y-axis. In particular, the cost-prominence relationship 210 shows click-through rates of 6%, 8%, and 10% along the x-axis, and shows costs of $6 CPC, $8 CPC, and $10 CPC along the y-axis. The curve 212 passes through points corresponding to 6% CTR and $6 CPC, 8% CTR and $9 CPC, and 10% CTR and $9.50 CPC. As explained in more detail below, these points and other points along the curve 212 correspond to amounts that the third-party providing TPC4 should pay for various levels of prominence. For example, when presentation of TPC4 will provide a CTR of 6%, the third-party should pay $6 CPC. Similarly, when presentation of TPC4 will provide a CTR of 8%, the third-party should pay $9 CPC, and when presentation of TPC4 will provide a CTR of 10%, the third-party should pay $9.50 CPC.

The points shown in the curve 212 can be identified using the first evaluation process. In some implementations, the content distribution system 110 determines, for each third-party content, the bid required for that third-party content to be presented in each of the available presentation locations (e.g., L1, L2, and L3). For example, assume that TPC1>TPC2>TPC3 when ranked in order of bid values. In this example, the first evaluation process will identify the amount needed to beat TPC1 (e.g., an amount marginally higher than the bid of TPC1) as the value of TPC4's bid that is required for TPC4 to obtain L1, the amount needed to beat TPC2 (e.g., an amount marginally higher than the bid of TPC2) as the value of TPC4's bid that is required for TPC4 to obtain L2, and the amount needed to beat TPC3 (e.g., an amount marginally higher than the bid of TPC3) as the value of TPC4's bid that is required for TPC4 to obtain L3. For purposes of this example, assume that those amounts are $9.50, $9, and $6, respectively. The first evaluation process can complete a similar evaluation for each of the other eligible third-party contents (e.g., TPC1, TPC2, and TPC3) in the set 206. Note that some of the bids identified during this evaluation may be higher than the current bid assigned to a given third-party content. For example, TPC4's current bid may not be as high as the amount needed to beat TPC1.

However, these values are used to create the cost-prominence relationship even if TPC4's bid is less than those amounts.

In some implementations, the cost-prominence relationship for a given third-party content can be created using cost-prominence pairs that each include a bid required for the given third-party content to obtain a given presentation location and the corresponding aggregate estimated click-through rate (or other prominence value) associated with that given presentation location. For example, the cost-prominence relationship 210 can be created using the cost-prominence pairs of ($9.50, 10%), ($9, 8%), ($6, 6%). Interpolation techniques can be used to generate the curve 212 that passes through these cost-prominence pairs. For example, linear or quadratic interpolation can be used to generate the curve 212, which can be represented as a mathematical relationship and stored in computer memory for subsequent use.

The curve 212 can be used, for example, to identify additional cost-prominence pairs corresponding to the cost-prominence relationship 210. For example, given a prominence value, the corresponding cost to obtain the corresponding level of prominence can be determined by identifying the intersection point between the given prominence value and cost on the curve 212. Of course, the cost can also be obtained by inputting the given prominence value into a mathematical relationship representing the curve 212. Similarly, a level of prominence obtainable, given a set cost, can also be determined using the curve 212 (e.g., by identifying the level of prominence corresponding to the set cost on the curve 212). As such, the cost of any level of prominence can be determined using the cost-prominence relationship 210.

Once the cost-prominence relationship has been created for a given third-party content, the cost-prominence relationship can be used to identify the cost of presenting that given third-party content in various combinations of presentation positions and formats. For example, a level of prominence can be obtained for each combination of presentation position and format, and the cost of that level of prominence can be identified using the cost-prominence relationship 210 in a manner similar to that discussed above. This cost can then be used to determine the price will be paid for presentation of the given third-party content when it is presented, as discussed in more detail below.

The content distribution system 110 performs a second evaluation process to identify a set of winning third-party content 214 from the set of eligible third-party content 206. More specifically, the second evaluation process can greedily move from one presentation position to the next and select the best third-party content for each presentation position. In some implementations, the second evaluation process takes into account formatting that can be applied to each third-party content when selecting the best third-party content 214 for each presentation position. For example, for each presentation position, the content distribution system 110 can determine rank scores for the third-party contents by scaling the bids of the third-party contents based, at least in part, on the respective estimated prominence values (e.g., estimated CTR) of each third-party content when presented in various formats at that presentation position.

For purposes of illustration, assume that TPC4 has a bid of $10 (making it eligible for presentation in L1), and that TPC4 can be presented in three different formats (A, B, and C). Further assume that the estimated CTR of TPC4 when formatted according to format A, and presented in L1 is X, while the estimated CTRs of TPC4 when formatted according to format B and format C, when presented in L1, are Y and Z, respectively. In this example, the rank scores for presenting TPC4 in L1 according to various formats can be as follows:

| Format | Rank Score (L1) |
|---|---|
| A | Bid * X |
| B | Bid * Y |
| C | Bid * Z |

In this example, the Rank Score of each format increases (or decreases) based on the expected prominence of TPC4 in each of the various formats when presented at presentation position L1. Rank Scores for each of the other third-party content in the set 206 can be similarly determined, and the third-party content having the highest Rank Score is selected as the winning third-party content for the presentation position.

In some implementations, the Rank Score for each format of a given third-party content can also be scaled based on the estimated prominence of the given third-party content when no formatting is applied and/or a normalizer. The estimated prominence of the given third-party content when no formatting is applied can be considered an estimated prominence value that is attributable to the presentation position (e.g., L1). As such, scaling the Rank Score based on both the estimated prominence of the formatted third-party content and the unformatted third-party content can reveal the amount of additional prominence that the formatting provides.

Continuing with the example above, assume that TPC4 has an estimated CTR of D when TPC4 is presented in L1 and no formatting is applied to TPC4. Additionally, assume that TPC4 has estimated CTRs of E and F when respectively presented in L2 and L3 without formatting. In this example, the Rank Scores for presenting TPC4 in L1 can be determined as follows:

| Format | Rank Score (L1) |
|---|---|
| A | Bid * (X/D) |
| B | Bid * (Y/E) |
| C | Bid * (Z/F) |

Rank Scores can similarly be determined for each format of other third-party content in the set 206, and a third-party content having the highest rank score can be selected for presentation in L1.

As noted above, the Rank Score for each format of a given third-party content can also be scaled based on a normalizer. In some implementations, a separate normalizer is determined for each combination of third-party content, presentation location, and formatting applied to the third-party content, and can be determined based on values from the cost-prominence relationship 210. For example, for a given third-party content and presentation position, the normalizer for each format can be determined from a ratio of the cost of a click when the third-party content is presented with the format relative to the cost of a click when the third-party content is presented without any formatting.

Continuing with the example above, the cost of a click for TPC4 when formatted according to format A and presented in L1 can be determined by identifying the location on the curve 212 that corresponds to the estimated prominence of TPC4 when formatted according to format A and presented in L1, and reading the CPC corresponding to that location on the curve 212. The cost of a click for TPC4 when presented in L1 without formatting can similarly be determined by identifying the location on the curve 212 corresponding to the estimated prominence of TPC4 when presented in L1 without formatting, and reading the CPC corresponding to that location on the curve 212. Once these costs are obtained from the curve, the normalizer can be determined according to relationship (1).

$$N_{(i, format)} = \frac{CPC_{(i, format)}}{CPC_{(i, no\ formatting)}} \quad (1)$$

where, $N_{(i,format)}$ is the normalizer for a given content item when presented in presentation position i, according to a given format;

$CPC_{(i,format)}$ is the cost of a click (or other user interaction) for the given content item when presented in presentation position i, according to the given format; and $CPC_{(i,no\ formatting)}$ is the cost of a click (or other user interaction) for the given content item when presented in presentation position i, with no formatting.

In some implementations, the normalizer can be used to determine the Rank Score determination as shown in relationship (2).

$$\text{Rank Score}(c, i, f) = \text{bid}_c * \frac{p_{c,i,f}}{N_{c,i,f} * p_{c,i,f0}} \quad (2)$$

where,

Rank Score (c,i,f) is the Rank Score of third-party content c, for presentation position i, when formatted according to format f;

$\text{bid}_c$ is the associated with the third-party content c;

$p_{c,i,f}$ is the estimated prominence of the third-party content c when presented in presentation position i, and presented according to format f;

$N_{c,i,f}$ is the normalizer for the third-party content c, for presentation position i, when formatted according to format f; and $p_{c,i,f0}$ is the estimated prominence of the third-party content c, when presented in presentation position i without any formatting applied.

In some implementations, the Rank Score can also be scaled based on the estimated prominence of the given third-party content in a reference presentation position (e.g., a specified and/or highest prominence presentation position) of the electronic document, as shown in relationship (3).

$$\text{Rank Score}_{c,i,f} = \text{bid}_c * \frac{p_{c,i,f}}{N_{c,i,f} * p_{c,i,f0}} * p_{c,ref} \quad (3)$$

where,

Rank Score$_{c,i,f}$ is the Rank Score of third-party content c, for presentation position i, when formatted according to format f;

$\text{bid}_c$ is the associated with the third-party content c;

$p_{c,i,f}$ is the estimated prominence of the third-party content c when presented in presentation position i, and presented according to format f;

$N_{c,i,f}$ is the normalizer for the third-party content c, for presentation position i, when formatted according to format f;

$p_{c,i,f0}$ is the estimated prominence of the third-party content c, when presented in presentation position i without any formatting applied; and $p_{c,ref}$ is the estimated prominence of the third-party content c, when presented in the reference presentation position without any formatting applied.

In some implementations, the content distribution system 110 determines the estimated prominence values discussed above based on historical prominence data (e.g., historical impression and/or click data), and in some implementations, the content distribution system 110 obtains the estimated prominence values for each third-party content/format combination from a database, such as the third-party corpus database 116, or another data processing apparatus (e.g., a prominence estimation apparatus). As such, these estimated prominence values can be considered input to the content distribution system 110, such that the content distribution system 110 need not determine the estimated prominence values. Also, it should be noted that additional factors or signals can be used to adjust the Rank Scores of third-party content.

As noted above, the Rank Scores for the various third-party content are used by the content distribution system 110 to select a set of winning third-party content 214 that will be presented in the presentation positions. In some implementations, the content distribution system 110 will sequentially select a winning third-party content for presentation in each presentation position independent of any other presentation positions that are included in the electronic document. The winning third-party content for each presentation position can be the third-party content having the highest Rank Score for that presentation position (e.g., independent of the formatting associated with the Rank Score).

For example, the content distribution system 110 can first select a winning third-party content for L1 without considering L2 or L3 (i.e., independent of L2 and L3). The winning third-party content for L1 will be the third-party content that has a highest Rank Score for L1. After selecting the winning third-party content for L1, the content distribution system 110 can then select a different winning third-party content (e.g., from the remaining available third-party content) for L2 without considering L1 or L3. The third-party content selected for L2 will be the remaining third-party content having a highest Rank Score for L2. After selecting the winning third-party content for L2, the content distribution system 110 can similarly select a different winning third-party content for L3 without considering L1 or L2.

Once the set of winning third-party content 214 are selected, formatting is selected for each winning third-party content. For example, the content distribution system 110 can select F1 216 as the formatting for the winning third-party content for L1, F2 218 as the formatting that will be applied to the winning third-party content for L2, and F3 220 as the formatting that will be applied to the winning third-party content for L3. Note that the selected formatting for a given winning third-party content can be a null formatting (i.e., the application of no formatting).

In some implementations, the formatting that is applied to a given winning third-party content can be the formatting that provides a highest bid eCPM ("estimated Cost Per Mille"), as this formatting will generally give the winning third-party content the highest number of clicks per impressions. Examples of the types of formatting that can be applied to a winning third-party content are discussed above, and the selected formatting (if any) is applied to the winning third-party content.

The content distribution system 110 generates presentation data (PD) 224 that cause the set of winning third-party content 214 to be combined with the electronic document at the user device 106. The presentation data 224 can include, for example, machine readable instructions that are transmitted over a data network to the user device 106. The user device 106 executes the machine readable instructions, which can cause the user device 106 to integrate the set of winning third-party content 214 into the electronic document. For example, the presentation data 224 can include instructions that cause the user device 106 to retrieve the set of winning third-party content 214 from one or more other servers, render the retrieved third-party content, and present the retrieved third-party content in L1, L2, and L3. In some implementations, the transmission of the presentation data 224 to the user device 106 is required to occur within a specified latency constraint, as discussed above.

The content distribution system 110 also determines prices 222 (P1, P2, P3) that will be paid for distribution of each third-party content in the set of winning third-party content 214 that are distributed to the user device 106. In some implementations, the price paid for distribution of a given winning third-party content is determined based on the cost-prominence relationship for the winning third-party content. For example, assume that TPC4 is the winning third-party content for L1, and that the format F1 216 is selected to be applied to TPC4. In this example, the content distribution system 110 can use the estimated prominence of TPC4 when presented in presentation position L1, and presented according to format F1 216 to find the price P1 that will be paid for distribution of TPC4. In particular, the content distribution system 110 can identify the point on the curve 212 corresponding to the estimated prominence of TPC4 when presented in L1 with format F1 216, and identify the CPC corresponding to this estimated prominence.

In some implementations, the price to be paid for distribution of a given third-party content can be determined using relationship (4).

$$CPC_{c,i,f} = N_{c,i,f} * CPC_{c,i,f0} \quad (4)$$

where, $CPC_{c,i,f}$ is the cost per click of third-party content c, when presented in presentation position i, according to format f;

$N_{c,i,f}$ is the normalizer for the third-party content c, for presentation position i, when formatted according to format f; and $CPC_{c,i,f0}$ is the cost per click of third-party content c, when presented in presentation position i without any formatting applied.

In some implementations, the price to be paid for distribution of a given third-party content can be determined using relationship (5).

$$\text{Rank Score}_{c+1,i} = CPC_{c,i,f} * \frac{p_{c,i,f}}{N_{c,i,f} * p_{c,i,f0}} * p_{c,ref} \quad (5)$$

where,

Rank Score$_{c+1,i}$ is the Rank Score of third-party content c+1 (i.e., the third-party content having a next highest Rank Score for presentation position i after third-party content c);

$CPC_{c,i,f}$ is the price to be paid for distribution of third-party content c, in presentation position i, according to format f;

$p_{c,i,f}$ is the estimated prominence of the third-party content c when presented in presentation position i, and presented according to format f;

$N_{c,i,f}$ is the normalizer for the third-party content c, for presentation position i, when formatted according to format f;

$p_{c,i,f0}$ is the estimated prominence of the third-party content c, when presented in presentation position i without any formatting applied; and $p_{c,ref}$ is the estimated prominence of the third-party content c, when presented in the reference presentation position without any formatting applied.

Solving relationship (5) for $CPC_c$ provides the price to be paid for distribution of the third-party content. Relationship (5) is similar to relationship (3), except that the Rank Score for the runner up third-party content (i.e., Rank Score$_{c+1}$) replaces the Rank Score of the third-party content c, and $CPC_{c,i,f}$ replaces bid$_c$. Relationship (5) determines the bid that is required in order for the Rank Score of the third-party content c to equal the Rank Score of the runner up third-party content, and uses that bid as the CPC for the third-party content c.

Figure 3:
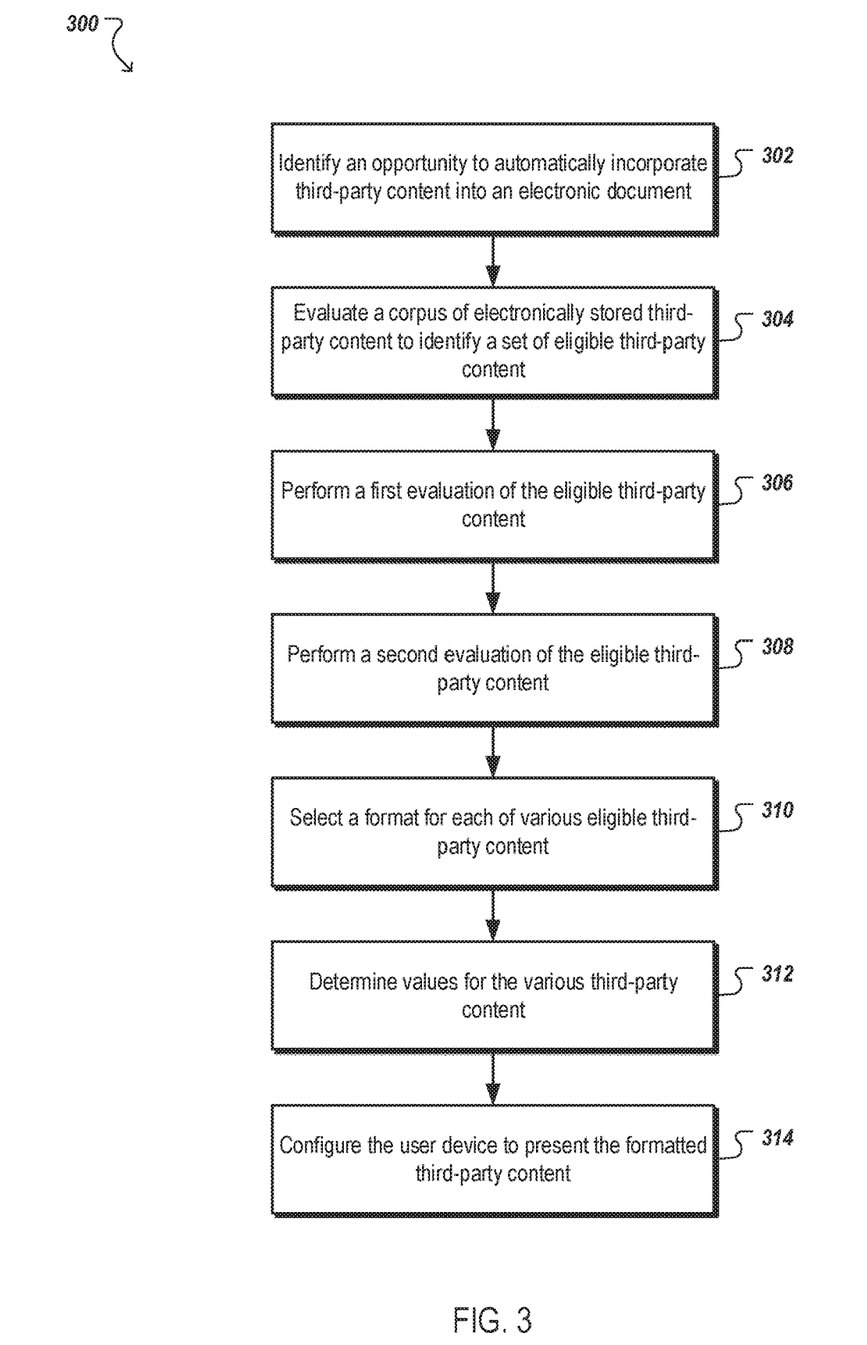
FIG. 3 is a block diagram of an example process for using a multistage evaluation process to select third-party content to be incorporated into an electronic document.

FIG. 3 is a block diagram of an example process 300 for using a multistage evaluation process to select third-party content to be incorporated into an electronic document. The process 300 can be implemented using a specially configured distributed computing system that selects winning third-party content within a specified amount of time following a request for third-party content (e.g., within a specified latency constraint). For example, the process 300 can be implemented using the content distribution system 110 of FIG. 1, which includes multiple data processors and one or more storage devices (e.g., physical memory devices). Operations of the process 300 can also be implemented as instructions encoded on a non-transitory computer readable medium. Execution of the instructions by a distributed computing system cause the distributed computing system to perform operations of the process 300.

An opportunity to automatically incorporate third-party content into an electronic document is identified (302). In some implementations, the opportunity to automatically incorporate third-party content into the electronic document is identified based on the identification of a presentation opportunity. The presentation opportunity can be identified, for example, based on receipt of a request for third-party content to be presented in the electronic document. For example, when a user device requests presentation of an electronic document, a script embedded in the electronic document may be executed by the user device. Execution of the script can automatically cause the user device to submit a request for third-party content to be incorporated into the presentation of the electronic document. This request can include various information as discussed above with reference to FIG. 1. Additionally, or alternatively, the opportunity to automatically incorporate third-party content into the electronic document may be identified based on evaluation of a user's interaction with a native application. For example, when a user opens a social networking native application on their device, information related to posts of that user's social network contacts (or other information associated with the user's social network account or the application itself) may indicate that there is an opportunity to incorporate third-party content into the user's social network feed or in other sections of the application.

A corpus of electronically stored third-party content are evaluated to identify a set of eligible third-party content (304). In some implementations, the corpus of electronically stored third-party content are evaluated based on information related to the identified presentation opportunity. For example, as discussed above with reference to FIG. 1, the electronically stored third-party content having distribution parameters that are matched by information corresponding to a presentation opportunity may be identified as eligible third-party content.

A first evaluation of the eligible third-party content is performed (306). In some implementations the first evaluation of the eligible third-party content includes performing a first evaluation process using the set of third-party content to obtain a cost-prominence relationship for each third-party content in the set.

Performance of the first evaluation process can include a series of operations that are performed for each given third-party content in the set of eligible third-party content. For example, the first evaluation process can include determining, for each given third-party content, a bid that is required for the given third-party content to be presented at each different location of the electronic document. As discussed above with reference to FIG. 2, the bid that is required for a given third-party content to be presented at a given location of the electronic document can be an incremental amount greater than a highest bid that is associated with other eligible third-party content.

For each given third-party content in the set of eligible third-party content, an estimated prominence value for the given third-party content in each location of the electronic document is also obtained during the first evaluation process. As discussed above, the estimated prominence value is an estimated measure of exposure for a third-party content when that third-party content is presented. In some implementations, the estimated prominence value for a given third-party content will vary depending on the location of the electronic document at which the third-party content is presented and/or formatting options that are applied to the given third-party content. During this portion of the first evaluation process, the estimated prominence value being obtained is the estimated exposure that will be provided to the third-party content when the third-party content is presented in a given location of the electronic document (e.g., absent formatting). In some implementations, the estimated prominence value corresponding to presentation of the third-party content in each of the presentation locations can be an aggregate estimated click-through rate associated with each of the positions (e.g., independent of which third-party content is presented in the presentation locations). Although we discuss presentation locations and formatting options for purposes of example, estimated prominence values can be determined for any type of presentation option (e.g., audio content, animations, expansions, layouts, etc.).

In some implementations, a cost-prominence relationship is created based on an interpolation of cost-prominence pairs created using the determined bids and obtained prominence values. For example, each cost-prominence pair can specify 1) the estimated prominence value for the given third-party content at a given location of the electronic document and 2) the bid required for the given third-party content to be presented at the given location of the electronic document. Creation of the cost-prominence relationship is described in detail with reference to FIG. 2.

A second evaluation of the eligible third-party content is performed (308). In some implementations, the second evaluation is separately performed for various different locations within the electronic document, and can include a second evaluation process that identifies a winning third-party content for each respective location. For example, as discussed above with reference to FIG. 2, the second evaluation process can include determining a set of rank scores for each third-party content. The set of rank scores for each third-party content includes a separate rank score for each format that is available to be applied to a given third-party content. The rank scores for each format can also be determined for each location of the electronic document. Each rank score for a given third-party content can be determined based on the estimated prominence value of the given third-party content when presented at a given location of the electronic document and formatted according to a given format. Each rank score can also be based on a normalizer for the formatting applied to the given third-party content at the given location. Relationship (2) and relationship (3) are example relationships that can be used to determine the rank scores.

During the second evaluation process, a winning third-party content is selected for each of the locations of the electronic document. In some implementations, the selection of the winning third-party content for each given location of the electronic document is performed separately. For example, as discussed above with reference to FIG. 2, a winning third-party content can be first selected for one location of the electronic document before a winning third-party content is selected for a different location of electronic document. The selection of the winning third-party content for a given location of the electronic document includes ranking each given third-party content based on the rank score for the given third-party content, and selecting a highest-ranking third-party content as the winning third-party content for that given location.

A format for each of various third-party content are selected (310). In some implementations, output of the first evaluation process is used to select the format of the winning third-party content. For example, the cost-prominence relationship can be used to identify the format that maximizes bid eCPM for the third-party content. In a particular example, the prominence corresponding to each available format for the third-party content can be used to identify the corresponding bid on the cost-prominence curve for the third-party content. Once the corresponding bids have been identified, they can be compared to the bid that has been specified for the third-party content, and the highest of the corresponding bids that is within (e.g., equal to or less than) the bid specified for the third-party content can be determined, and the format corresponding to that highest corresponding bid can be selected as the format for the third-party content.

Values for the various third-party content are determined (312). In some implementations, determination of the values for the various third-party content includes determination of a price to be paid for distribution of a winning third-party content. The price to be paid can be determined, for example, based on a function of the normalizer associated with a combination of the winning third-party content, the format applied to the winning third-party content, and the location of the electronic document in which the winning third-party content will be presented. As discussed above with reference to FIG. 2, the price can be determined using relationship (4) or relationship (5). In some implementations, the normalizer is a ratio of a cost of a user interaction (e.g., a user click) when the winning third-party content is formatted according to a given format and presented in a given location of an electronic document relative to a cost of a user interaction when the winning third-party content is presented in the given location of the electronic document without formatting being applied.

The user device is automatically configured to present the formatted third-party content (314). In some implementations the automatic configuration of the user device includes transmitting, to the user device, machine readable instructions that automatically configure the user device to present the winning third-party content with the given electronic document and according to the format. In certain situations, the first evaluation process and the second evaluation process are performed after identifying the presentation opportunity, and the transmission of the machine readable instructions must occur within a latency constraint.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
   a third-party corpus database electronically storing various third-party content that are available to be incorporated into an electronic document, wherein the various third-party content are indexed in the third-party corpus database according to one or more parameters;
   a distributed computing system including a set of multiple computing devices that are interconnected and electronically access the third-party corpus database to evaluate the various third-party content, based at least in part on the one or more parameters, and transmit digital data corresponding to a set of the various third-party content to a user device, wherein:
   the digital data includes machine readable instructions that configure the user device to incorporate the set of various third-party content into a presentation of a given electronic document at the user device;
   the distributed computing system selects the set of various third-party content and formatting for the at least some of the various third-party content in the set based on multiple evaluation processes including performing:
      a first evaluation process that provides the distributed computing system with a separate cost-prominence relationship for each third-party content in the set, wherein performance of the first evaluation process by the distributed combing system includes performance of operations comprising:
      identifying, for each location among the various locations of the given electronic document, an aggregate performance of multiple different third-party content when presented in that location of the given electronic document;
      for each third-party content:
         determining a bid amount required for that third-party content to be presented in each of the various locations of the given electronic document; and
         fitting a cost-prominence curve to points each representing an intersection of the aggregate performance at one of the various locations of the given document and the bid amount required for that third-party content to be presented in that location of the given document; and
      a second evaluation process that identifies, independent of the cost-prominence relationship, a winning third-party content for each of one or more locations of the electronic document, including at least a first location; wherein:
   the digital data include instructions that present the winning third-party content at the user device according to a given format that is automatically selected by the distributed computing system based on the cost-prominence relationship of the first evaluation process.

2. The system of claim 1, wherein one of the computing devices in the distributed computing system is a server that is configured to segment the evaluation of the various third party content into multiple separate tasks that are respectively assigned to two or more other computing devices in the distributed computing system.

3. The system of claim 2, wherein the two or more other computing devices are each configured to separately process the separate tasks that are respectively assigned to the two or more other computing devices, and electronically communicate results of the separate tasks to the server.

4. The system of claim 1, wherein the first evaluation process and the second evaluation process are performed by the distributed computing system in less time than that required for the distributed computing system to perform a combinatorial evaluation process using the set of third-party content.

5. The system of claim 1, wherein performance of the first evaluation process includes, for each given third-party content, creating in a memory structure, the cost-prominence relationship for the given third-party content.

6. The system of claim 5, wherein the distributed computing system creates the cost-prominence relationship based on an interpolation of the points.

7. The system of claim 1, wherein the distributed computing system determines, for each format of each given third-party content, a normalizer for each location of the given electronic document based on a cost of a click when formatted according to the format and presented in the location divided by a cost of a click when presented in the location but not formatted according to the format.

8. The system of claim 7, wherein the second evaluation process includes a selection by the distributed computing system of a highest ranking third-party content as the winning third-party content, wherein the distributed computing system performs the ranking based on a rank score that is determined, by the distributed computing system, based, at least in part, on an estimated prominence value attributed the first location, an estimated prominence value for the given third-party content when formatted according to the format, and the normalizer for the format of the given third-party content at the first location.

9. The system of claim 7, wherein the distributed computing system automatically determines a price to be paid for distribution of the winning third-party content, after performing the second evaluation process and selecting the format of the winning third-party content, based on a function of a cost of user interaction when the winning third-party content is presented in the first location and according to the selected format and a cost of a user interaction when the winning third-party content is presented in the first location but not formatted according to the selected format.

10. A method of distributing third-party content based on a multiple-stage evaluation process performed by a specially configured distributed computing system, the method comprising:
    identifying a particular presentation opportunity for a particular presentation of third-party content in various locations of a given electronic document presented at a user device;
    evaluating, based on information related to the identified particular presentation opportunity, a corpus of electronically stored third-party content to identify a set of third-party content eligible to be presented in the given electronic document;
    performing, by a distributed computing system and for the presentation opportunity, a first evaluation process using the set of third-party content to obtain a separate cost-prominence relationship for each third-party content in the set, including:
        identifying, for each location among the various locations of the given electronic document, an aggregate performance of multiple different third-party content when presented in that location of the given electronic document;
        for each third-party content:
            determining a bid amount required for that third-party content to be presented in each of the various locations of the given electronic document; and
            fitting a cost-prominence curve to points each representing an intersection of the aggregate performance at one of the various locations of the given document and the bid amount required for that third-party content to be presented in that location of the given document;
    performing, for a first location of the given electronic document, by the distributed computing system and independent of the cost-prominence relationship, a second evaluation process to identify a winning third-party content for the first location;
    selecting, by the distributed computing system, a format of the winning third-party content based, at least in part, on the cost-prominence relationship of the first evaluation process; and
    transmitting, to the user device, machine readable instructions that automatically configure the user device to present the winning third-party content with the given electronic document and according to the format, wherein the first evaluation process and the second evaluation process are both performed after identifying the presentation opportunity, before transmitting the instructions that configure the user device to present the winning third-party content with the given electronic document, and within a latency constraint for providing third-party content responsive to the identified particular presentation opportunity.

11. The method of claim 10, wherein the first evaluation process and the second evaluation process are performed by the distributed computing system in less time than that required for the distributed computing system to perform a combinatorial evaluation process using the set of third-party content.

12. The method of claim 10, wherein performing the first evaluation process comprises:
    for each given third-party content:
        creating, in a memory structure, the cost-prominence relationship for the given third-party content.

13. The method of claim 12, wherein creating the cost-prominence relationship for the given third-party content comprises creating, in the memory structure, the cost-prominence relationship based on an interpolation of the points.

14. The method of claim 10, further comprising:
    for each given third-party content:
        determining, for each format of the given third-party content, a normalizer for each location of the given electronic document based on a cost of a click when formatted according to the format and presented in the location divided by a cost of a click when presented in the location but not formatted according to the format.

15. The method of claim 14, wherein performing the second evaluation process comprises:
    for the first location of the given electronic document:
        determining, for each format of each given third-party content, a rank score based, at least in part, on an estimated prominence value attributed the first location, an estimated prominence value for the given third-party content when formatted according to the format, and the normalizer for the format of the given third-party content at the first location;
ranking each given third-party content based on the rank score for the given third-party content; and
selecting a highest ranking third-party content as the winning third-party content.

16. The method of claim 14, further comprising determining a price to be paid for distribution of the winning third-party content after performing the second evaluation process and selecting the format of the winning third-party content, including identifying the price to be paid based on a function of a cost of user interaction when the winning third-party content is presented in the first location and according to the selected format and a cost of a user interaction when the winning third-party content is presented in the first location but not formatted according to the selected format.

17. A non-transitory computer storage medium encoded with a computer program, the program comprising instructions that when executed by a distributed computing system cause the distributed computing system to perform operations comprising:
identifying a particular presentation opportunity for a particular presentation of third-party content in various locations of a given electronic document presented at a user device;
evaluating, based on information related to the identified particular presentation opportunity, a corpus of electronically stored third-party content to identify a set of third-party content eligible to be presented in the given electronic document;
performing, by a distributed computing system and for the particular presentation opportunity, a first evaluation process using the set of third-party content to obtain a separate cost-prominence relationship for each third-party content in the set, including:
identifying, for each location among the various locations of the given electronic document, an aggregate performance of multiple different third-party content when presented in that location of the given electronic document;
for each third-party content:
determining a bid amount required for that third-party content to be presented in each of the various locations of the given electronic document; and
fitting a cost-prominence curve to points each representing an intersection of the aggregate performance at one of the various locations of the given document and the bid amount required for that third-party content to be presented in that location of the given document;
performing, for a first location of the given electronic document, by the distributed computing system and independent of the cost-prominence relationship, a second evaluation process to identify a winning third-party content for the first location;
selecting, by the distributed computing system, a format of the winning third-party content based, at least in part, on the cost-prominence relationship of the first evaluation process; and
transmitting, to the user device, machine readable instructions that automatically configure the user device to present the winning third-party content with the given electronic document and according to the format, wherein the first evaluation process and the second evaluation process are both performed after identifying the particular presentation opportunity, before transmitting the instructions that configure the user device to present the winning third-party content with the given electronic document, and within a latency constraint for providing third-party content responsive to the identified particular presentation opportunity.

18. The computer storage medium of claim 17, wherein the first evaluation process and the second evaluation process are performed by the distributed computing system in less time than that required for the distributed computing system to perform a combinatorial evaluation process using the set of third-party content.

19. The computer storage medium of claim 17, wherein performing the first evaluation process comprises:
for each given third-party content:
creating, in a memory structure, the cost-prominence relationship for the given third-party content.

20. The computer storage medium of claim 19, wherein creating the cost-prominence relationship for the given third-party content comprises creating, in the memory structure, the cost-prominence relationship based on an interpolation of the points.

21. The computer storage medium of claim 17, further comprising:
for each given third-party content:
determining, for each format of the given third-party content, a normalizer for each location of the given electronic document based on a cost of a click when formatted according to the format and presented in the location divided by a cost of a click when presented in the location but not formatted according to the format.

22. The computer storage medium of claim 21, wherein performing the second evaluation process comprises:
for the first location of the given electronic document:
determining, for each format of each given third-party content, a rank score based, at least in part, on an estimated prominence value attributed the first location, an estimated prominence value for the given third-party content when formatted according to the format, and the normalizer for the format of the given third-party content at the first location;
ranking each given third-party content based on the rank score for the given third-party content; and
selecting a highest ranking third-party content as the winning third-party content.

23. The computer storage medium of claim 21, further comprising determining a price to be paid for distribution of the winning third-party content after performing the second evaluation process and selecting the format of the winning third-party content, including identifying the price to be paid based on a function of a cost of user interaction when the winning third-party content is presented in the first location and according to the selected format and a cost of a user interaction when the winning third-party content is presented in the first location but not formatted according to the selected format.

* * * * *

UNITED STATES PATENT AND TRADEMARK OFFICE
CERTIFICATE OF CORRECTION

PATENT NO. : 10,102,304 B1
APPLICATION NO. : 14/968671
DATED : October 16, 2018
INVENTOR(S) : Muralidharan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 293 days.

Signed and Sealed this
Sixteenth Day of July, 2019

Andrei Iancu
*Director of the United States Patent and Trademark Office*